United States Patent [19]

Miller

[11] 4,333,640

[45] Jun. 8, 1982

[54] AUTOMATIC DOCUMENT PROCESSING MACHINE

[75] Inventor: Jacky F. A. Miller, Paris, France

[73] Assignee: Compagnie Internationale pour l'Informatique CII Honeywell Bull (Societe Anonyme), Paris, France

[21] Appl. No.: 104,858

[22] Filed: Dec. 18, 1979

[30] Foreign Application Priority Data

Dec. 28, 1978 [FR] France .................................. 78 36795

[51] Int. Cl.³ .............................................. B65H 3/44
[52] U.S. Cl. ......................................... 271/9; 271/274
[58] Field of Search ....................... 271/9, 273, 274, 8; 226/89

[56] References Cited

U.S. PATENT DOCUMENTS

| | | | |
|---|---|---|---|
| 1,939,671 | 12/1933 | Dodds | 226/89 X |
| 3,672,487 | 6/1972 | Schneider | 271/9 X |
| 3,756,586 | 9/1973 | Craft | 271/9 |
| 4,221,375 | 9/1980 | Morrison | 271/9 X |

OTHER PUBLICATIONS

IBM Technical Disclosure Bulletin, vol. 17, No. 4, 9-1974, p. 958, "Priority Insertion Card Mechanism," R. E. Hunt.

Primary Examiner—Richard A. Schacher
Attorney, Agent, or Firm—Kerkam, Stowell, Kondracki & Clarke

[57] ABSTRACT

An improvement to an automatic document handling machine of the kind having at least one processing station and possibly a guide track to hold and transport documents to the processing station. The processing station or the guide track includes an entry port for documents and a unit insertion means for inserting one of said documents into the processing station or the guide track. The insertion means comprising a support means for the document which includes an exit port for documents, a drive means capable of making contact with the document in the said support means to feed the document towards the exit, and an engaging means which is adapted to produce relative movement between support means and the drive means. The insertion means is arranged close to the processing station or the guide track and is positioned in such a way that the document exit port faces the document entry port at least when the said engaging means is operated.

16 Claims, 2 Drawing Figures

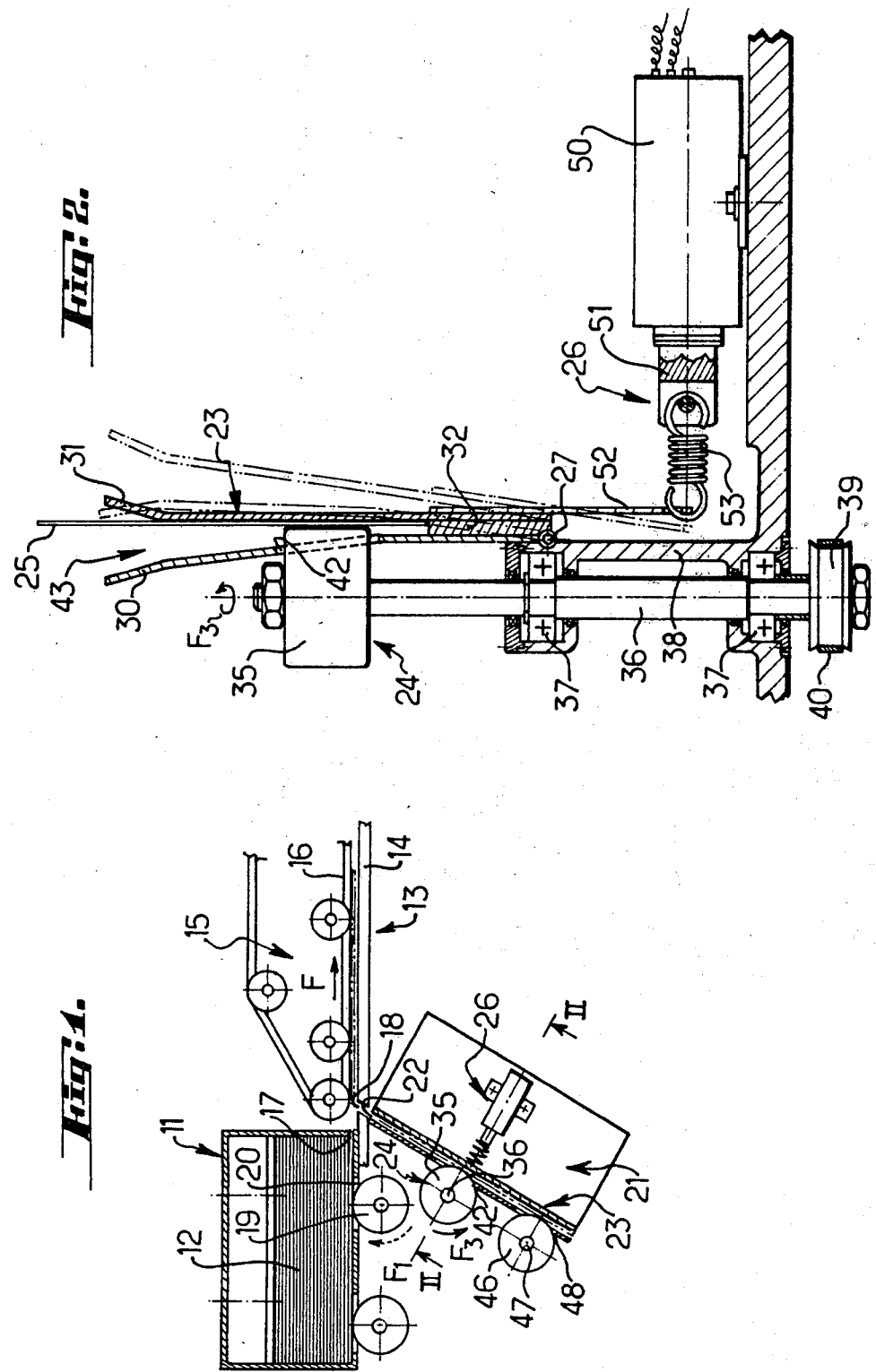

AUTOMATIC DOCUMENT PROCESSING MACHINE

BACKGROUND OF THE INVENTION

1. Field of the Invention

The present invention relates to machines for automatic processing documents, in particular checks, and, more specifically, relates to machines for processing of documents which are assigned a priority of treatment.

2. Description of the Prior Art

There are many automatic document processing machines. In particular, all the major banks are now using machines for the automatic processing of checks. A machine of this kind has a magazine in which checks are stacked before being extracte from it one-by-one by a suitable mechanism and fed to successive processing stations. The stations are normally connected together by guide tracks which are adapted to transport the checks from one processing station to the next.

A typical arrangement and machines for processing documents are described and illustrated in copending application Ser. No. 075,228 of Lucien Prieur and Patrick Pinard, filed Sept. 13, 1979 and assigned to the assignee of the present invention.

It may happen that, while the machine is operating, it is desired to insert another check into the machine for priority treatment. It is then necessary to stop the machine, open the supply magazine, move back the stack of checks yet to be processed and slip the extra check in front of the stack, that is to say, place it in the immediate proximity of the extractor mechanism. Such an operation takes time and is not without its dangers since, if the extra check is mispositioned, there is a danger that this will cause it to be incorrectly transferred to the first, adjacent processing station or to the guide track leading to this processing station. This usually means that the check is crumpled as it enters the processing station or the guide track, and may cause a jam.

SUMMARY OF THE INVENTION

The invention enables this danger to be overcome while at the same time considerably reducing the time taken to insert the checks for priority treatment. The improvement made by the present invention consists in providing a particularly simple and reliable means for inserting single articles which is generally situated near the loading magazine and which is positioned facing the entry to the processing station or the guide track.

More precisely, the invention relates to an automatic document handling machine of the kind having in particular at least one processing station and possibly a guide track to hold and transport one of the documents to the processing station. The processing station or the guide track includes an entry port for documents, and a unit insertion means for inserting a simple one of said documents into the processing station or the guide track. The insertion means comprises a support means for the document which includes an exit port for documents, a drive means capable of making contact with the document in the said support means to feed the document towards the exit, and an engaging means which is adapted to produce relative movement between the support means and the drive means. The insertion means is arranged close to the processing station or the guide track and is positioned in such a way that the document exit port faces the document entry port at least when the said engaging means is operated.

As will be apparent from the above definition, it is of course perfectly possible for the unit insertion means to form the sole means for inserting the documents into the processing machine when the latter is of a simplified kind. The loading magazine mentioned above is then simply dispensed with.

BRIEF DESCRIPTION OF THE DRAWINGS

The invention will be better understood, and further objects, details and advantages will become more readily apparent from the following explanatory description of an arrangement employing the principle of the invention, the description being given solely by way of example with reference to the accompanying schematic drawings, in which:

FIG. 1 is a fragmentary schematic view from above of part of an automatic check processing machine provided with the improvement according to the invention, and FIG. 2 is a detailed view, partially in cross section, on line II—II of FIG. 1, and to an enlarged scale, of the improvement according to the invention.

DESCRIPTION OF THE PREFERRED EMBODIMENTS

Referring to the drawings, there is shown a part of an automatic check processing machine embodying the present invention. A loading magazine 11 has stacked therein number of checks 12. A guide track 13 in the form of a support member 14 extends longitudinally in the direction in which the check is required to move and has positioned adjacent thereto belt conveyor 15. A belt 16 travels along opposite the support member 14 to cause a check to slide between the belt and support along the support member in the direction of arrow F, when required. The magazine 11 has a document exit port 17 situated close to a document entry port 18 associated with the guide track 13.

Means for extracting checks contained in the magazine 11 is indicated symbolically by a roller 19 which is driven in rotation in the direction of the arrow F1 by any suitable means (not shown). The peripheral edge of roller 19 projects into the magazine 11 through an opening 20 and is thus in contact with the lowermost check in the magazine 11 of which one edge faces the exit port 17. When the roller 19 is caused to rotate, the check is thus extracted from the magazine 11 and enters the guide track 13 through entry port 18.

The improvement provided by the invention resides in the fact that a unit insertion means 21 is provided for inserting into the feed path through entry port 18 a single document, of the same kind as those which are positioned in the magazine 11. Insertion means 21 includes a document exit port 22 and is arranged close to the magazine in such a way that its document exit port 22 is situated close to the document entry port 18 of guide track 13. To be more exact, it can clearly be seen in FIG. 1 that the two exit ports 17 and 22 are arranged substantially vertically with respect to each other and adjacent one another and that a document coming from either of them is fed without fail towards the entry 18. Preferably, the path of a document from unit insertion means 21, i.e. the plane in which the document lies, is at an angle with respect the plane of guide track 13 such that the document from means 13 enters at an angle into entry port 18, while the path of movement of documents from magazine 11 through ports 17 and 18 are in the same plane. Of course, the postions of the magazine 11 and insertion means 11 can be interchanged and magazine 11 could feed documents into the entry port at an angle thereto, i.e. magazine 11 could be supported at an angle with respect to the plane of guide track 13.

The unit insertion means 21 comprises a support means 23 for the document. The support means is arranged above exit 22 as viewed in the drawings, and a drive means 24, capable of making contact with a document 25 in the support means 23 to feed it towards the exit 22, is supported above the document. An engaging means 26, which is adapted to produce relative movement between the support means and the drive means 24, is supported below support means 23, as viewed in the drawing. The support means 23 is mounted to pivot to a limited angular extent about a horizontal hinge 27 relative to the drive means 24. It should be noted that the unit insertion means 21 is positioned relative to the entry 18 in such a way that the exit port 22 for the documents in exactly in line with the entry port 18 when the engaging means 26 is actuated, that is to say when the support means 23 is tilted towards the drive means 24. In FIG. 2, the position of the support means 23 when the engaging means 26 is actuated is shown in solid lines, while its position when the engaging means is not actuated is shown in broken lines.

The support means 23 is very simply constructed from two plates 30, 31 which are assembled and spaced apart from one another by a spacer piece 32 which is situated on the inserts of the two plates close to the edge connected to hinge 27. The plates 30 and 31 diverge slightly from one another in a direction away from the hinge 27 so as to make it easier for a check 25 to be inserted in the entry port.

The drive means 24 comprises a roller 35 mounted on a shaft 36, the later being mounted to rotate by means of ball races 37 on a support 37 on a support 38. The hinge 37 is likewise attached to the support 38. The shaft 36 has a drive pulley 29 at its lower end by means of which it is driven in rotation by a belt 40 and an electric motor (not shown), which may be the motor driving the belt conveyor 15. The shaft 36 is thus situated in the immediate vicinity of the plates 30 and 31 and the plate 30, which is closer to the roller 35, contains an opening 42 which is formed opposite the circumferential surface of roller 35 to enable a portion of the roller to enter the cavity defined within the plates 30 and 31, until it comes to rest against the inside face of the plate 31, furthest from the roller 35, when the engaging means 36 is actuated. If a check 25 has been previously inserted in the internal cavity 43 formed between plates 30, 31, the lateral surface of the roller 35 makes propulsive contact with the check 25. It can also be seen in FIG. 1 that a free-mounted roller 46 is likewise fitted on a shaft 47 parallel to shaft 36 on the same side of the support means 23. Plate 30 is also provided with a second opening 48 situated facing the circumferential surface of the free-mounted roller 46. The function of the free-mounted roller is to steady the document on its trajectory.

The engaging means 26 mounted to support 38 comprises an electromagnet 50, preferably having a linearly moving armature which, in the specific example illustrated, is a plunger 51. The plunger is articulated to the support means 23 to produce the pivoting movement illustrated in FIG. 2. For this purpose, a lever 52 is secured at one end to the support means 23, to the outer surface of the lower end of plate 31, and the other end of the lever 52 is connected to the plunger 51 by a spring 53. The spring could be replaced by a simple articulated link, in particular a tie-rod.

The manner of operation of the unit insertion means is extremely simple and will be clearly apparent from the foregoing description. The roller 35 may be driven in rotation intermittently, but it is also possible for it to rotate continuously in the direction of arrow F3. In normal operation, checks 12 are extracted one-by-one from the magazine 11 and are fed toward a processing station via the guide track 13. If an operator wishes to introduce a check such as 25 into the processing machine, he merely has to place the check in the internal cavity 43 in the support means 23 and operate the means (not shown) for actuating the electromagnet 50, rather than operating the means for actuating roller 19. Under these conditions no check emerges from exit port 17, but the check 25 is fed from the exit port 22 to the entry port 18 and automatically engages in the guide track 13. Of course, if the handling machine does not have a guide track 13, but instead a processing station arranged directly adjacent the exit ports 17 and 22, the check 25 is fed directly to the processing station. Also, with a simplified machine operating at a lower rate of speed, it is advantageous for the magazine 11 to be replaced by the means 21 for unit insertion as described above.

The invention is, of course not in any way restricted to the embodiment which has just been described and covers all technical equivalents of the means employed which come within the true spirit and full scope of the invention as defined in the following claims.

I claim:

1. An automatic document processing machine comprising a loading magazine containing a stack of documents and provided with a throat though which said documents can be extracted one-by-one from said magazine, feeding means for controlling the extraction of said stacked documents, one-by-one, through said throat, a guide track provided with at least one processing station adapted for treating only one document at a time, said track having a document entry situated close to said throat and in line with said throat, and unit insertion means for inserting another single document which includes an exit for documents, a drive means disposed to come into contact with said another document in the said support means arranged to feed the said another document to the said exit, and an engaging means adapted to produce relative movement between the said support means and the said drive means, said support means having its exit disposed adjacent to the throat of said loading magazine and to the document entry of said guide track, and arranged so that said exit is in line with said document entry at least when the said engaging means is actuated at an instant different from that at which said feeding means is actuated and wherein said support means comprises two plates, a spacer between one end of each of said plates for spacing said plates away from one another and forming an internal cavity therebetween, a pivot hinge, said support means being mounted to said pivot hinge to pivot relative to the said drive means upon actuation of said engaging means.

2. A machine according to claim 1, wherein said two plates diverge slightly from one another at the other end of said plates in a direction away from the said pivot hinge.

3. A machine according to claim 1 or 2, wherein the said drive means comprises a roller mounted on a drive shaft disposed on one side and adjacent said plates, the plate nearer to said roller having a first opening formed substantially opposite the circumferential surface of the said roller so as to enable the said circumferential surface to enter the internal cavity defined by the said two plates until it comes to bear against the inside face of the plate further away from the said roller when the said engaging means is actuated.

4. A machine according to claim 3, further including a free-mounted roller fitted on a shaft parallel to said drive shaft of said drive means and on the same side of the said support means, and said plate nearer to said rollers having a second opening arranged substantially opposite the circumferential surface of the said free-mounted roller.

5. A machine according to claim 1 or 2, wherein said engaging means comprises an electromagnet having a linearly movable armature, and means for connecting said movable armature to said support means to cause the latter to pivot relative to the said drive means upon actuation of said engaging means.

6. A machine according to claim 5, wherein said means for connecting said armature to said support means includes a lever secured to the said support means, one end of the lever being connected to the said support means and the other end of the lever being connected to said movable armature.

7. A machine according to claim 6, including a spring connecting the other end of the lever to the movable armature.

8. A machine according to claim 1, wherein said two plates diverge slightly from one another at the other end of said plates in a direction away from the said pivot hinge.

9. A machine according to claim 1, wherein the said drive means comprises a roller mounted on a drive shaft disposed on one side and adjacent said plates, the plate nearer to said roller having a first opening formed substantially opposite the circumferential surface of the said roller so as to enable the said circumferential surface to enter the internal cavity defined by the said two plates until it comes to bear against the inside face of the plate further away from the said roller when the said engaging means is actuated.

10. A machine according to claim 9, further including a free-mounted roller fitted on a shaft parallel to said drive shaft of said drive means and on the same side of the said support means, and said plate nearer to said rollers having a second opening arranged substantially opposite the circumferential surface of the said free-mounted roller.

11. A machine according to claim 10, wherein said engaging means comprises an electromagnet having a linearly movable armature, and means for connecting said movable armature to said support means to cause the latter to pivot relative to the said driving means upon actuation of said engaging means.

12. A machine according to claim 11, wherein said means for connecting said armature to said support means includes a lever secured to the said support means, one end of the lever being connected to the said support means and the other end of the lever being connected to said movable armature.

13. A machine according to claim 3, wherein said engaging means comprises an electromagnet having a linearly movable armature and means for connecting said movable armature to said support means to cause the latter to pivot relative to the said drive means upon actuation of said engaging means.

14. A machine according to claim 13, wherein said means for connecting said armature to said support means includes a lever secured to the said support means, one end of the lever being connected to the said support means and the other end of the lever being connected to said movable armature.

15. A machine according to claim 4, wherein said engaging means comprises an electromagnet having a linearly movable armature and means for connecting said movable armature to said support means to cause the latter to pivot relative to the said drive means upon actuation of said engaging means.

16. A machine according to claim 14, wherein said means for connecting said armature to said support means includes a lever secured to said support means, and the other end of the lever being connected to said movable armature.

* * * * *

UNITED STATES PATENT AND TRADEMARK OFFICE
CERTIFICATE OF CORRECTION

PATENT NO. : 4,333,640
DATED : June 8, 1982
INVENTOR(S) : Jacky F. A. Miller

It is certified that error appears in the above–identified patent and that said Letters Patent are hereby corrected as shown below:

Claim 11, column 6, line 14, change "driving" to --drive--.

Signed and Sealed this

Twenty-fourth Day of August 1982

[SEAL]

Attest:

GERALD J. MOSSINGHOFF

Attesting Officer     Commissioner of Patents and Trademarks